(12) United States Patent
Aida et al.

(10) Patent No.: US 10,680,424 B2
(45) Date of Patent: Jun. 9, 2020

(54) OVERHEAD WIRE DAMPER

(71) Applicants: FURUKAWA ELECTRIC POWER SYSTEMS CO., LTD., Kanagawa (JP); Tokyo Electric Power Company Holdings, Inc., Tokyo (JP)

(72) Inventors: Ryota Aida, Kanagawa (JP); Shuichi Higashida, Kanagawa (JP); Kozo Takeda, Kanagawa (JP); Sadanori Nakazawa, Kanagawa (JP); Katsuhiro Ouchi, Tokyo (JP); Kenji Iida, Tokyo (JP); Hiroaki Mitsuzuka, Tokyo (JP); Yuta Hamada, Tokyo (JP)

(73) Assignees: Furukawa Electric Power Systems Co., Ltd., Kanagawa (JP); Tokyo Electric Power Company Holdings, Inc., Tokyo (JP)

( * ) Notice: Subject to any disclaimer, the term of this patent is extended or adjusted under 35 U.S.C. 154(b) by 36 days.

(21) Appl. No.: 15/938,982

(22) Filed: Mar. 28, 2018

(65) Prior Publication Data

US 2018/0366932 A1    Dec. 20, 2018

(30) Foreign Application Priority Data

Mar. 31, 2017    (JP) .................................. 2017-069506

(51) Int. Cl.
*H02G 7/14* (2006.01)
*F16F 7/10* (2006.01)
*H02G 7/05* (2006.01)

(52) U.S. Cl.
CPC ................. *H02G 7/14* (2013.01); *F16F 7/10* (2013.01); *F16F 7/1022* (2013.01); *H02G 7/05* (2013.01)

(58) Field of Classification Search
None
See application file for complete search history.

(56) References Cited

U.S. PATENT DOCUMENTS

| 4,223,176 | A | * | 9/1980 | Hawkins | ................ | H02G 7/125 174/146 |
| 4,278,833 | A | * | 7/1981 | Hawkins | ................ | H02G 7/125 174/146 |
| 4,385,201 | A | * | 5/1983 | Nigol | ....................... | H02G 7/14 174/42 |
| 4,523,053 | A | * | 6/1985 | Rawlins | .................... | H02G 7/14 174/42 |

FOREIGN PATENT DOCUMENTS

JP    2012034470 A    2/2012

* cited by examiner

*Primary Examiner* — Dimary S Lopez Cruz
(74) *Attorney, Agent, or Firm* — Dorsey & Whitney LLP (57) ABSTRACT

An overhead line damper capable of suppressing a lift force that an overhead line receives due to wind is provided. A damper 1 for an overhead line that is provided at an overhead line L2 includes a clamping mechanism (a pair of hinge pieces 21a and 21b) that is fitted to an outer circumferential surface of the overhead line L2, and a rotary member 4 with a lower part attached to weights 3a and 3b, and an upper part rotatably attached to the clamping mechanism, and the clamping mechanism has a regulation part (an opening part 24) that regulates a rotation range of the rotary member 4 so that the weights 3a and 3b rotate within an angle range from ±20 degrees to ±40 degrees inclusive in a vertical direction.

2 Claims, 10 Drawing Sheets

OVERHEAD WIRE DAMPER

BACKGROUND OF THE DISCLOSURE

Field of the Disclosure

The present disclosure relates to an overhead line damper that is used in an overhead line such as a power transmission line and a ground wire, and particularly relates to an overhead line damper that inhibits a lift force which the overhead line receives due to wind or the like.

Description of the Related Art

Conventionally, in overhead lines such as a power transmission line and a ground wire, when snow accretes on an overhead line, the overhead line twists by rotating due to the dead weight of the snow which accretes on the overhead line, the snow develops into a cylinder shape while rotating, and a disorder such as occurrence of breaking occurs. Accordingly, in order to prevent twisting of the overhead line due to accretion of snow, an overhead line damper is provided at the overhead line.

In such an overhead line damper, a twist prevention damper is used in which a rotary movable part that rotates along outer circumferential surfaces of collars that grip the overhead line is provided at an upper part, and clamp parts in which weights are fitted are provided at a lower part (for example, refer to Patent Literature 1).

In the twist prevention damper, stoppers that stop rotation of the overhead line at predetermined rotation angles are provided at the collars and the rotary movable part, and inhibit a lift force (hereinafter, also referred to as "galloping") which the overhead line receives due to wind or the like by making the snow accretion shape of the snow accreting on the overhead line uneven.

Patent Literature 1: Japanese Patent Application Laid-Open No. 2012-34470

SUMMARY OF THE DISCLOSURE

However, in the twist prevention damper of the aforementioned configuration, the stoppers which stop rotation of the overhead line at the predetermined rotation angles are provided, but the rotation angle which is effective to suppress galloping is not disclosed, and an overhead line damper having a rotation angle effective to suppress galloping is demanded.

The present disclosure is related to providing an overhead line damper capable of effectively inhibiting a lift force which the overhead line receives due to wind or the like.

In accordance with one aspect of the present disclosure, an overhead line damper is an overhead line damper that is provided at an overhead line, including a clamping mechanism that is fitted to an outer circumferential surface of the overhead line, and a rotary member with a lower part attached to a weight, and an upper part rotatably attached to the clamping mechanism, wherein the clamping mechanism has a regulation part that regulates a rotation range of the rotary member so that the weight rotates within an angle range from ±20 degrees to ±40 degrees inclusive with respect to a vertical direction.

In the overhead line damper, the rotary member has a rotary part that is rotatable between the overhead line and the clamping mechanism, and a connection part that connects the rotary part and the weight, the regulation part has opening end surfaces that demarcate an opening part in which the clamping mechanism opens to a side of the weight, and the connection part regulates rotation of the weight by abutting on the opening end surfaces.

In the overhead line damper, the clamping mechanism is formed of a pair of hinge pieces, the pair of hinge pieces have rotation side end parts at sides that clamp the rotary member, and connection side end parts that connect the rotation side end parts to each other to be openable and closable, and the pair of hinge pieces have the opening end surfaces of the regulation part formed when the rotation side end parts are closed.

Using the overhead line damper according to the present disclosure, the lift force which the overhead line receives due to wind or the like can be effectively inhibited.

BRIEF DESCRIPTION OF THE DRAWINGS

FIGS. 11A and 11B are sectional views in a section along line A-A illustrated in FIG. 9, FIG. 11A is a sectional view illustrating a state in which a pair of hinge pieces illustrated in FIG. 10 are closed, and FIG. 11B is a sectional view illustrating a state in which the pair of hinge pieces illustrated in FIG. 10 are opened.

DETAILED DESCRIPTION OF THE PREFERRED EMBODIMENTS

Embodiment

Hereinafter, an embodiment of the present disclosure will be described specifically with reference to the accompanying drawings.

1. Overhead Line Simulation

First of all, with reference to FIG. 1 to FIG. 8, an analysis result of analyzing vibrations of an overhead line will be described. When the overhead line rotates due to snow accreted on the overhead line and receiving wind or the like, a weight rotates in a direction opposite to that in which the overhead line rotates. Therefore, a rotation angle of the weight which is suitable to make a snow accretion that is attached to the overhead line uneven and is effective for suppressing vibrations of the overhead line will be verified by a simulation by analysis software (Galloping analysis code of a power transmission line: CAFSS, Version of the galloping analysis code of the power transmission line: CAFSS EVOLUTION PRO version 1.01. 03).

[1-1. Simulation in First Analysis Condition]

Figure 1:
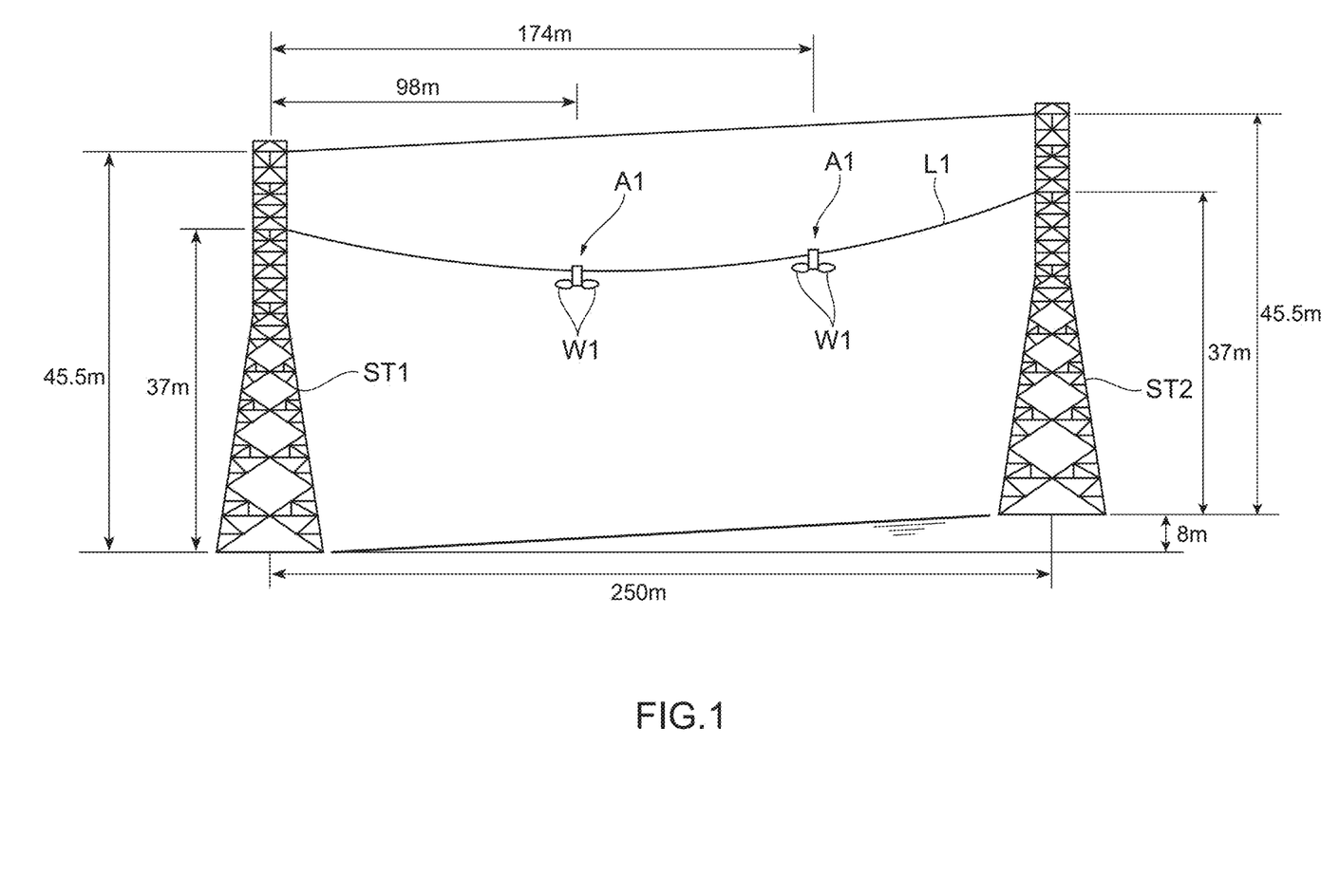
FIG. 1 is a view illustrating a first analysis condition of an overhead line for performing a simulation.
Figure 2:
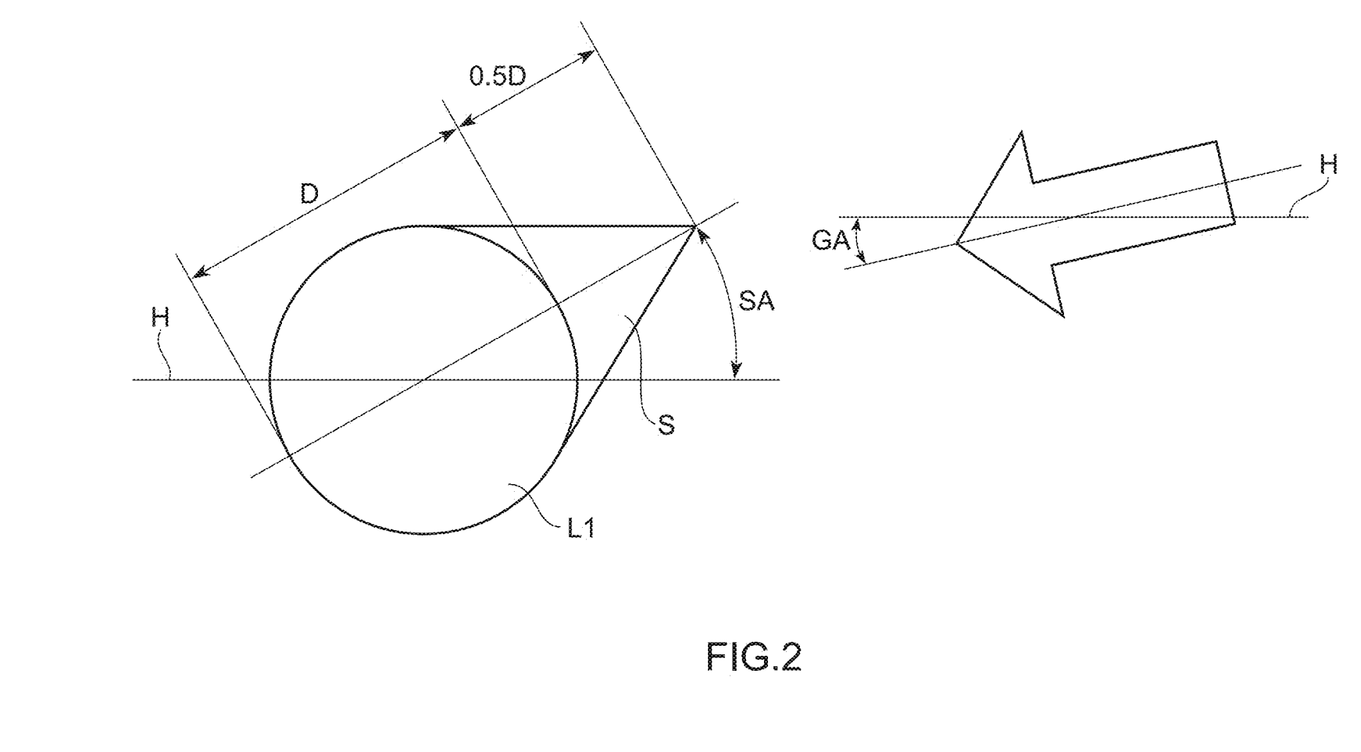
FIG. 2 is a view illustrating an uplift angle of wind which the overhead line in FIG. 1 receives, and a simulation accretion of snow that accretes on the overhead line.
Figure 3:
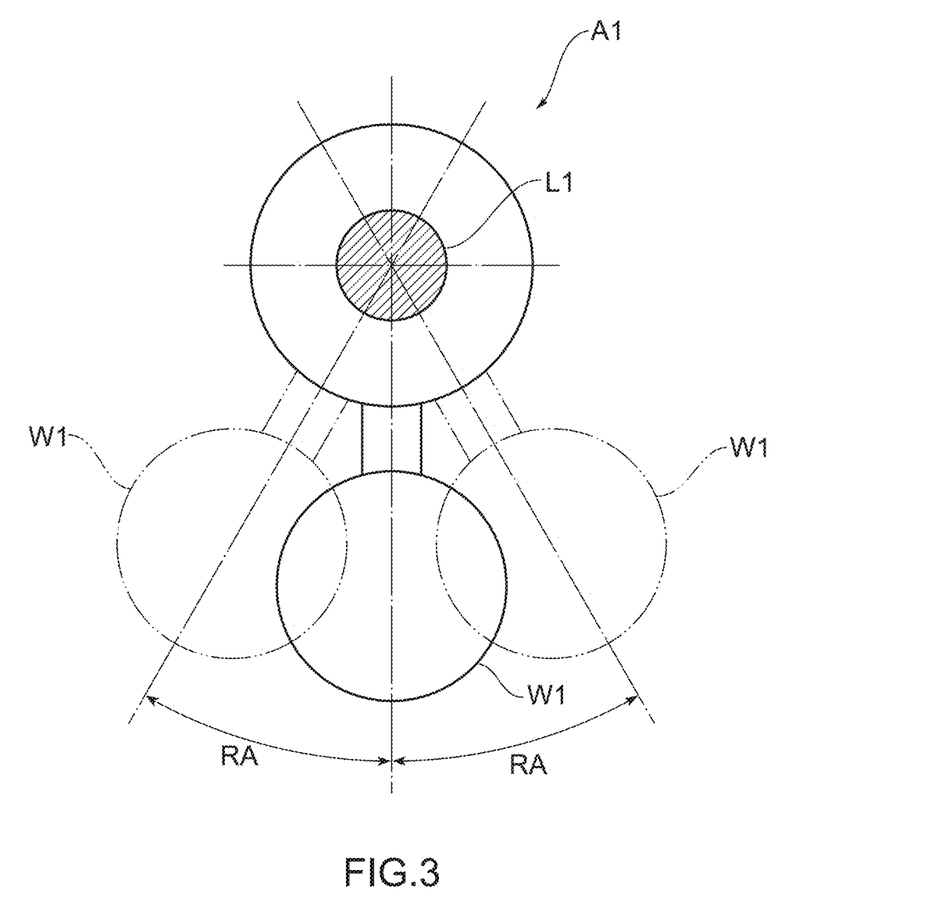
FIG. 3 is a plan view illustrating a rotation angle of a weight of an overhead line damper in FIG. 1.

First, with reference to FIG. 1 to FIG. 3, a simulation in a first analysis condition will be described. FIG. 1 is a view illustrating the first analysis condition of an overhead line L1 for performing the simulation. FIG. 2 is a sectional view illustrating an uplift angle of wind which the overhead line L1 receives in a case of seeing the overhead line L1 from a steel tower ST1 side in FIG. 1, and simulation snow accretion S of snow accreting on the overhead line L1. FIG. 3 is a plan view illustrating a rotation angle of a weight W1 of a damper A1 for overhead line in FIG. 1.

As illustrated in FIG. 1, a simulation was performed with a case in which two of the overhead line dampers A1 are disposed at the overhead line L1 between the steel tower ST1 and a steel tower ST2 that are 45.5 m high, set as the first analysis condition. Specifically, a level difference between the steel tower ST1 and the steel tower ST2 was set as 8 m, and a span length between the steel tower ST1 and the steel tower ST2 was set as 250 m.

A case was assumed in which the overhead line L1 illustrated in FIG. 1 was formed of an aluminum conductors steel reinforced (ACSR) which was a single conductor with a sectional area of 410 mm$^2$, and was laid between a position at a height of 37 m from the ground in the steel tower ST1, and a position at a height of 37 m from the ground in the steel tower ST2.

Further, a case was assumed in which the A1 overhead line dampers, which were disposed at the overhead line L1, were counterweights each for a sectional area of 410 mm$^2$, and were respectively disposed at a position of 98 m from the steel tower ST1 to the steel tower ST2, and a position of 174 m from the steel tower ST1 to the steel tower ST2.

As illustrated in FIG. 2, when wind is received by the overhead line L1, an uplift angle GA of the wind when seen from a steel tower ST1 side to a steel tower ST2 side was −2 degrees with respect to a horizontal line H, and an average wind velocity was 15.4 m/s, as for a shape of the simulation snow accretion S of snow accreting on the overhead line L1, a sectional shape seen from the steel tower ST1 side was assumed to be a substantially triangular shape. Specifically, as for the shape of the simulation snow accretion S, a length from an outer circumference of the overhead line L1 to a vertex of the triangle is 0.5D with respect to an outside diameter D of the overhead line L1, and an initial snow accretion angle SA from the horizontal line H to the vertex of the triangle is 10 degrees.

Subsequently, as illustrated in FIG. 3, a simulation was performed according to the first analysis condition with respect to the overhead line L1 in the case in which a rotation angle RA with a perpendicular line (a phantom line) to a vertical direction of the weight W1 of the damper A1 for overhead line as a center of rotation was set as 0 degrees, ±20 degrees, ±30 degrees and ±40 degrees. In this case, when the overhead line L1 has snow accreted on the overhead line L1 and rotates by receiving wind or the like, the weight W1 rotates in an direction opposite that of the overhead line L1 rotating direction by its own weight.

Figure 4:
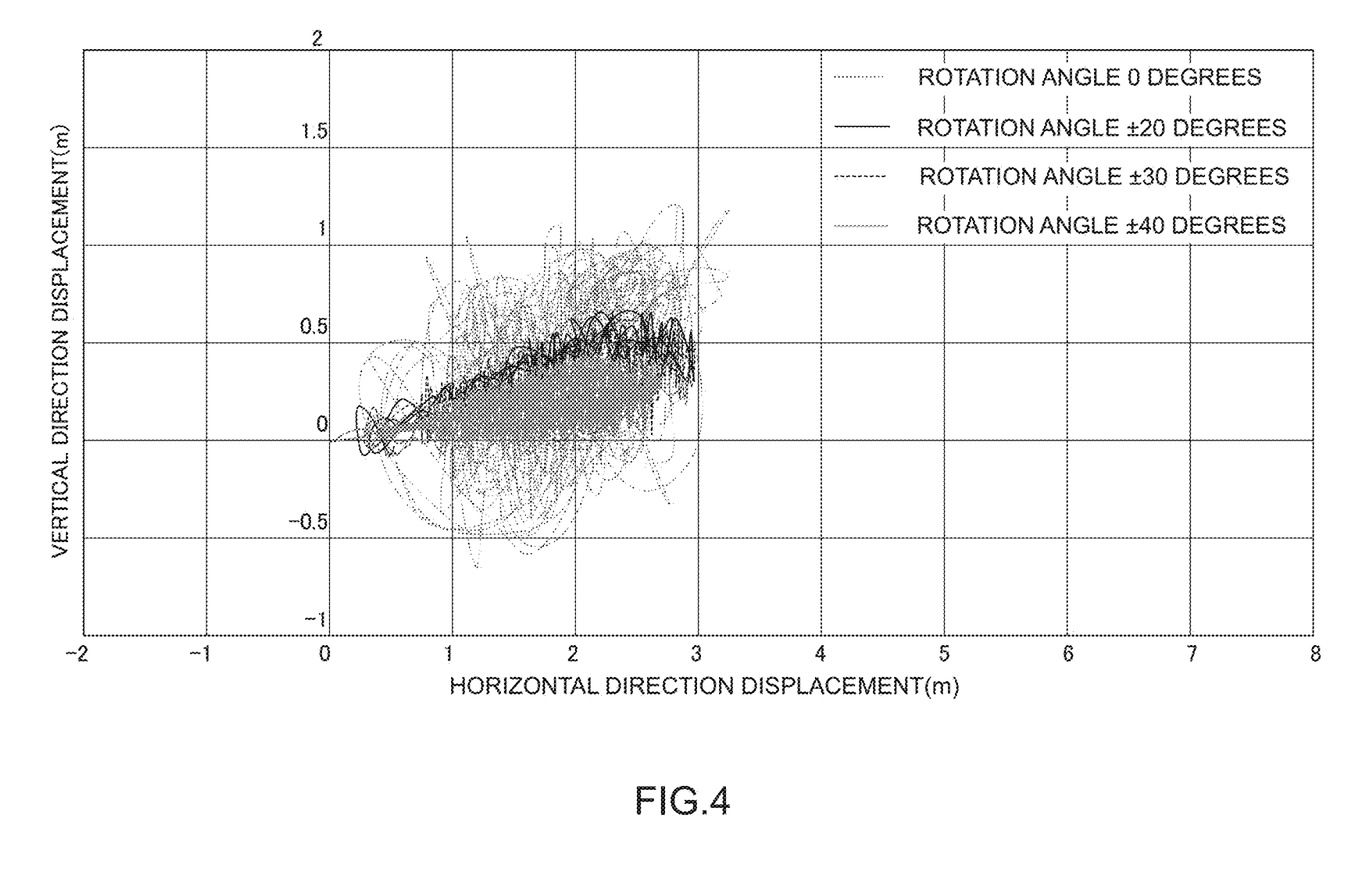
FIG. 4 is a diagram illustrating a displacement in a horizontal direction and a displacement in a vertical direction of the overhead line in the first analysis condition.

A result of the simulation that was performed under the first analysis condition is illustrated in FIG. 4. FIG. 4 is a diagram illustrating loci (hereinafter, referred to as Lissajous) drawing vibrations (a displacement in the horizontal direction and a displacement in the vertical direction (that is, a lift force)) by the first analysis condition of the overhead line L1 to which the two dampers A1 for overhead line are fitted.

As illustrated in FIG. 4, as for displacements in the vertical direction and the horizontal direction of the overhead line L1 to which the two dampers A1 for overhead line are fitted, the overhead line L1 was displaced in a range from approximately 0 m to 3.3 m in the horizontal direction and approximately −0.7 m to 1.3 m in the vertical direction in a case of the rotation angle RA being 0 degrees. Further, the overhead line L1 was displaced in a range from approximately 0 m to 3 m in the horizontal direction and approximately −0.1 to 0.7 m in the vertical direction in a case of the rotation angle being ±20 degrees, displaced in a range from approximately 0 m to 3 m in the horizontal direction and approximately −0.1 to 0.6 m in the vertical direction in a case of the rotation angle RA being ±30 degrees, and displaced in a range from approximately 0 m to 3 m in the horizontal direction and approximately −0.1 to 0.5 m in the vertical direction in a case of the rotation angle RA being ±40 degrees.

In this way, as the result that the simulation was performed according to the first analysis condition on the overhead line L1, it was found that the lift force of the overhead line L1 in the vertical direction is suppressed at ±20 degrees, ±30 degrees and ±40 degrees as compared with the case of the rotation angle RA of the weight W1 being 0 degrees, as the simulation result. Consequently, it is estimated that the lift force which the overhead line L1 receives in the first analysis condition can be effectively suppressed when the rotation angle of the weight W1 is any angle RA of ±20 degrees, ±30 degrees and ±40 degrees.

[1-2. Simulation in Second Analysis Condition]

Figure 5:
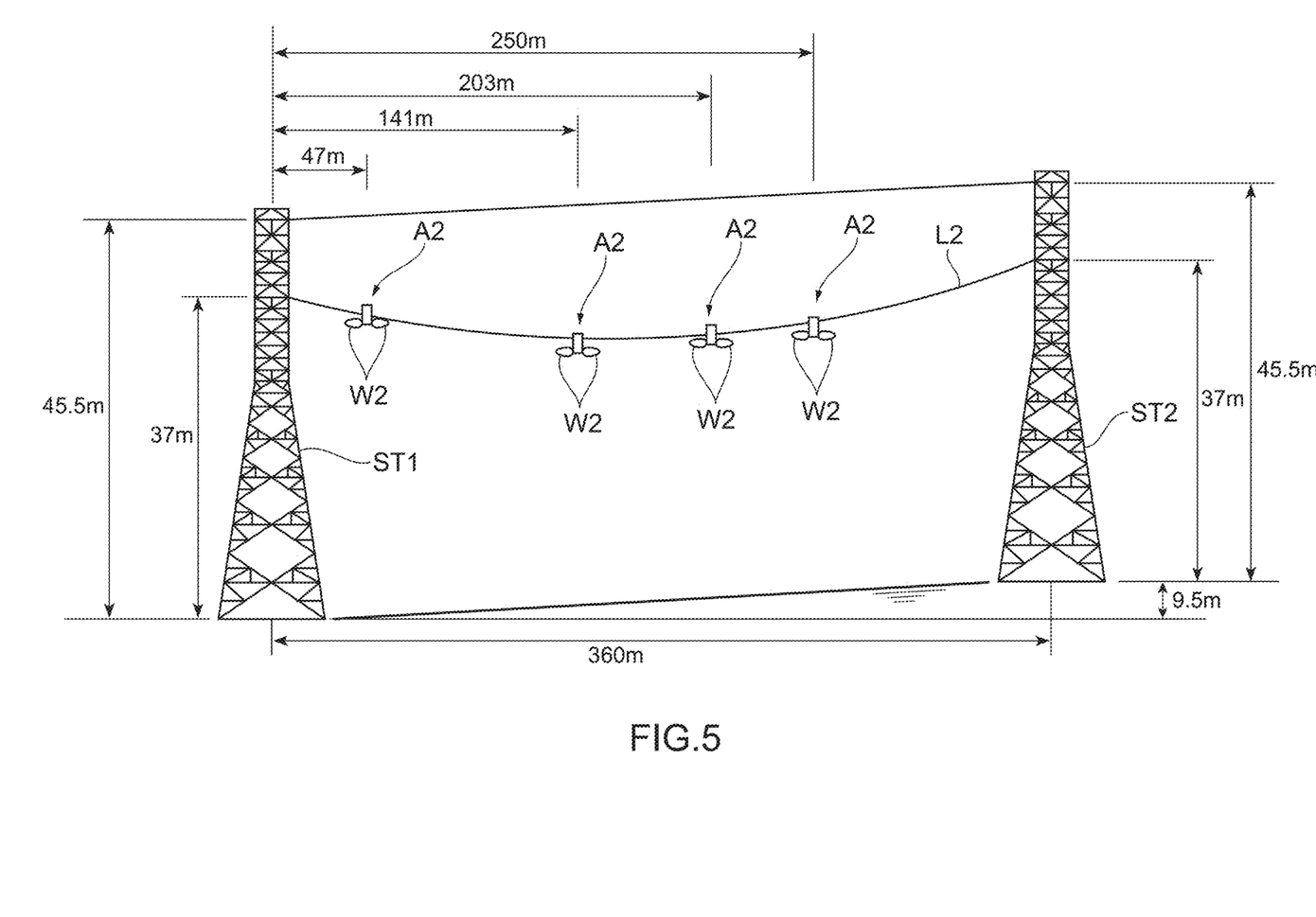
FIG. 5 is a view illustrating a second analysis condition of an overhead line for performing a simulation.

Next, with reference to FIG. 5, a simulation in a second analysis condition will be described. FIG. 5 is a view illustrating a second analysis condition of an overhead line L2 for performing the simulation.

As illustrated in FIG. 5, the simulation was performed with a case in which four dampers A2 for an overhead line are disposed at the overhead line L2 between the steel tower ST1 and the steel tower ST2 that are 45.5 m high set as the second analysis condition. Specifically, a level difference between the steel tower ST1 and the steel tower ST2 was set as 9.5 m, and a span length between the steel tower ST1 and the steel tower ST2 was set as 360 m.

A case was assumed in which the overhead line L2 illustrated in FIG. 5 was formed of an aluminum conductors steel reinforced (ACSR) which was a single conductor with a sectional area of 160 mm$^2$, and was laid between a position at a height of 37 m from the ground in the steel tower ST1, and a position at a height of 37 m from the ground in the steel tower ST2. That is, the overhead line L2 differs from the overhead line L1 in sectional area.

Further, a case was assumed in which the A2 overhead line dampers, which were disposed at the overhead line L2, are counterweights each for a sectional area of 160 mm$^2$, and were respectively disposed at a position of 47 m from the steel tower ST1 to the steel tower ST2, a position of 141 m from the steel tower ST1 to the steel tower ST2, a position of 203 m from the steel tower ST1 to the steel tower ST2, and a position of 250 m from the steel tower ST1 to the steel tower ST2.

As for wind which the overhead line L2 receives, the uplift angle GA of the wind when seen from the steel tower ST1 side to the steel tower ST2 side was set as −2 degrees with respect to a horizontal line H similarly to the first analysis condition (refer to FIG. 2). However, unlike under the first analysis condition, under the second analysis condition, the average wind velocity was set as 15 m/s. In this case, as for a shape of the simulation snow accretion of snow accreting on the overhead line L2, a sectional shape seen from the steel tower ST1 side was assumed to be a substantially triangular shape similar to the first analysis condition (refer to FIG. 2). In this case, specifically, as for the shape of the simulation snow accretion S, a length from an outer circumference of the overhead line L2 to a vertex of the triangle is also 0.5D with respect to an outside diameter D of the overhead line L2, but the initial snow accretion angle SA (refer to FIG. 2) from the horizontal line H to the vertex of the triangle is 30 degrees.

The simulation was performed according to the second analysis condition with respect to the overhead line L2 in the case in which the rotation angle RA (refer to FIG. 3) with a perpendicular line (a phantom line) to a vertical direction of a weight W2 of the damper A2 for an overhead line as a center of rotation was set at 0 degrees, ±30 degrees and ±40 degrees. In this case, when the overhead line L2 has snow accreted on the overhead line L2 and rotates by receiving wind or the like, the weight W2 is also assumed to rotate in a rotation direction opposite to that of the overhead line L2 by its own weight.

Figure 6:
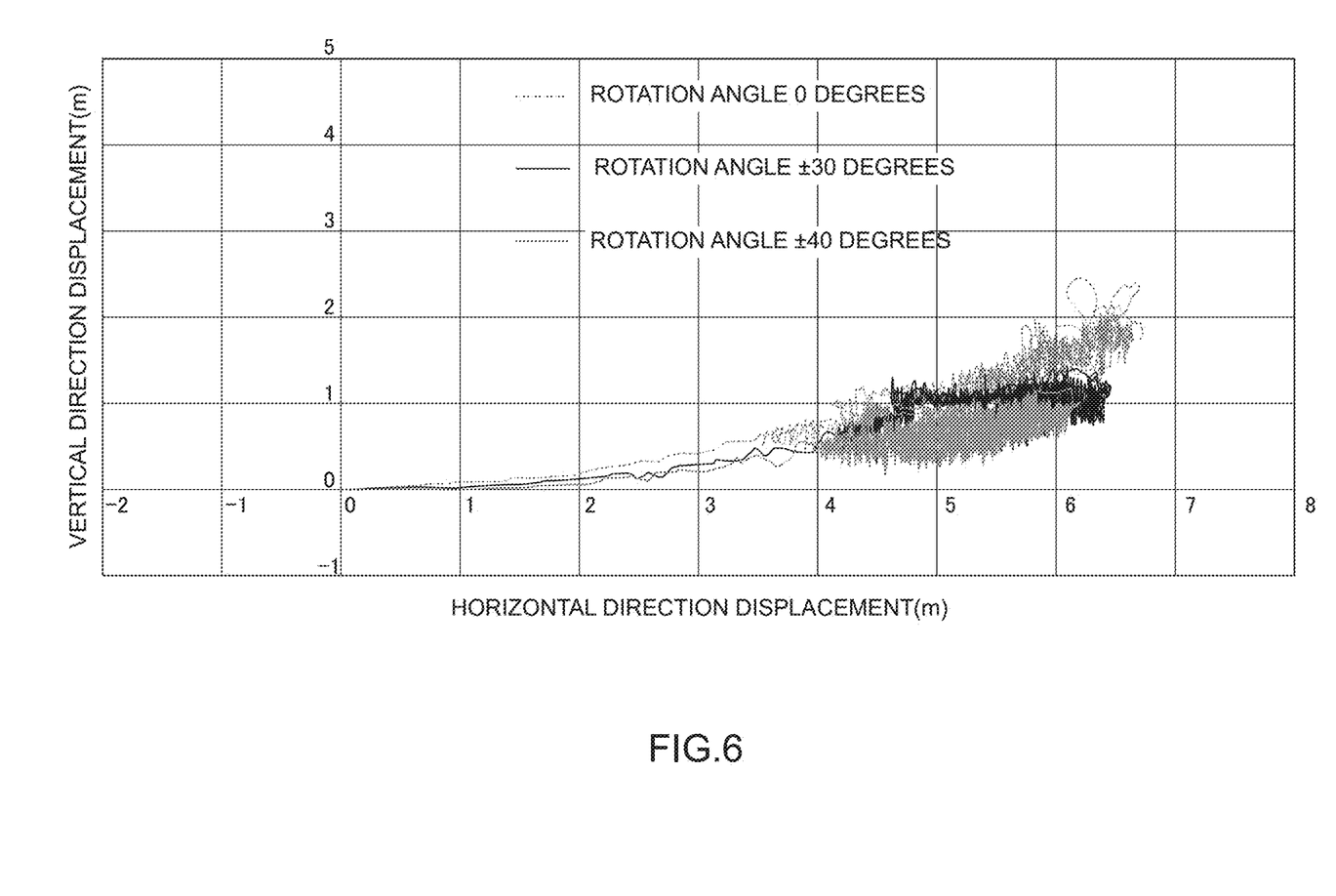
FIG. 6 is a diagram illustrating a displacement in the horizontal direction and a displacement in the vertical direction of the overhead line in the second analysis condition.

A result of the simulation performed under the second analysis condition is illustrated in FIG. 6. FIG. 6 is a diagram illustrating Lissajous drawing vibrations (a displacement in the horizontal direction and a displacement in the vertical direction (that is, a lift force)) by the second analysis condition of the overhead line L2 to which the four dampers A2 for overhead line are fitted.

As illustrated in FIG. 6, as for the displacements in the vertical direction and the horizontal direction of the overhead line L2 to which the four dampers A2 for overhead line are fitted, the overhead line L2 was displaced in a range from approximately 0 m to 6.7 m in the horizontal direction and approximately 0 m to 2.5 m in the vertical direction in a case of the rotation angle RA being 0 degrees. Further, the overhead line L2 was displaced in a range from approximately 0 m to 6.5 m in the horizontal direction and approximately 0 m to 1.5 m in the vertical direction in a case of the rotation angle RA being ±30 degrees, and displaced in a range from approximately 0 m to 6.2 m in the horizontal direction and approximately 0 m to 1.1 m in the vertical direction in a case of the rotation angle RA being ±40 degrees.

In this way, as the result of the simulation performed according to the second analysis condition to the overhead line L2, it was found that the lift force of the overhead line L2 in the vertical direction is suppressed at ±30 degrees and ±40 degrees, as compared with the case of the rotation angle RA of the weight W2 being 0 degrees, as shown in the simulation result. Consequently, it is estimated that the lift force which the overhead line L2 receives in the second analysis condition can be effectively suppressed when the rotation angle RA of the weight W2 is either ±30 degrees or ±40 degrees.

[1-3. Simulation Result Verification]

Figure 7:
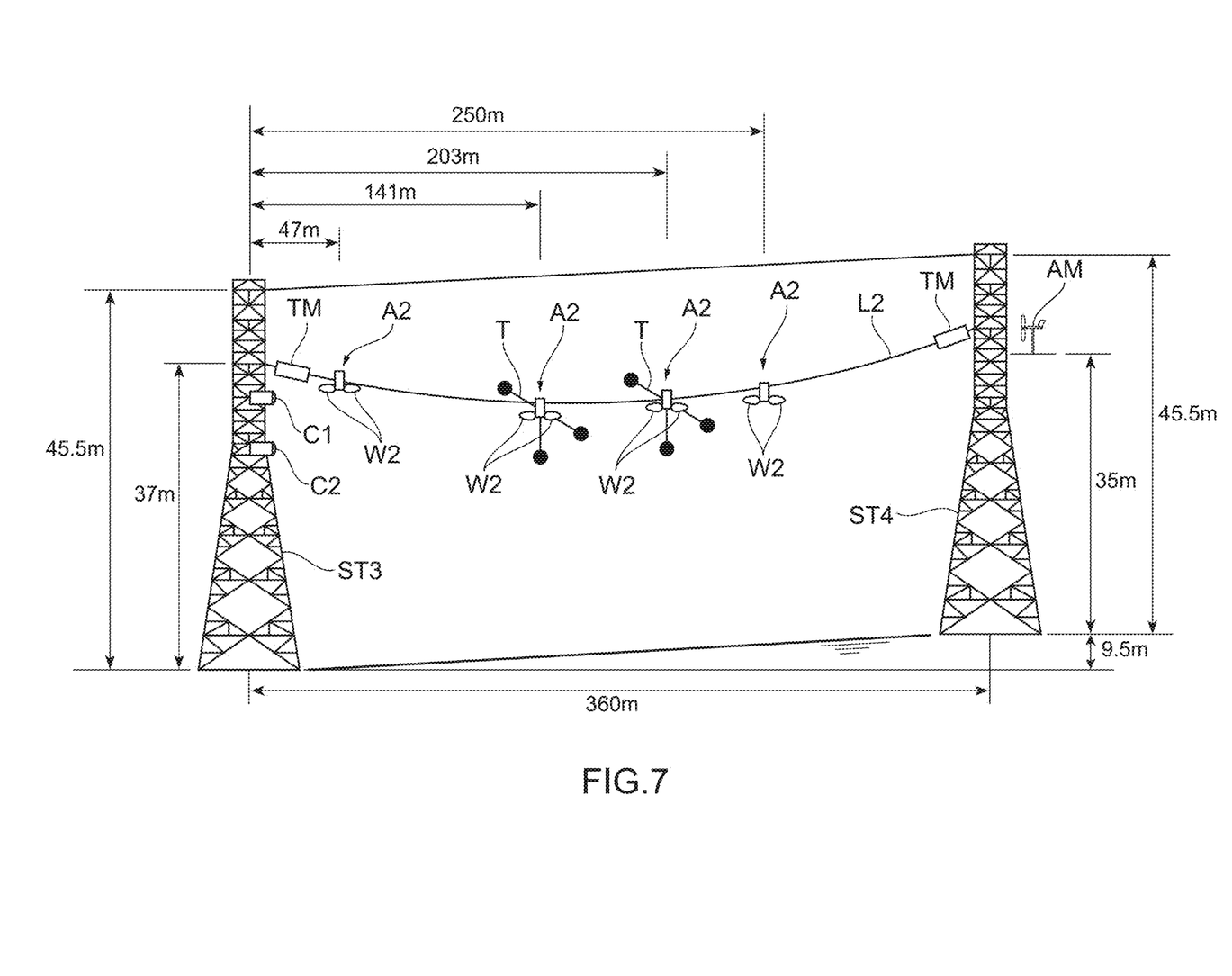
FIG. 7 is a view illustrating an observation condition for performing verification of a simulation result.

Thereafter, with reference to FIG. 7, an experimental result which is actually verified to ascertain whether or not the aforementioned simulation result is correct will be described. FIG. 7 is a view illustrating an observation condition (an experimental condition) for performing verification of the simulation result.

As for verification of the simulation result, the simulation result is verified with a case in which the overhead line L2 and the four dampers A2 for overhead line in the aforementioned second analysis condition are used as the observation condition. Specifically, observation was performed by actually fitting the four overhead line dampers A2 to the overhead line L2 which is laid between a Mogami test line No. 3 steel tower ST3 and No. 4 steel tower ST4 which are installed in 8-112, Osekidai, Karikawa, Shounaimachi, Higashitagawa-gun, Yamagata prefecture.

Further, as for an initial snow accretion angle of snow that accretes on the overhead line L2, the initial snow accretion angle SA from the horizontal line H to the vertex of the triangle was set as 30 degrees, similar to the second analysis condition.

Subsequently, vibrations of the overhead line L2 to which the dampers A2 for overhead line with the rotation angles RA (refer to FIG. 3) of the weights W2 of the dampers A2 for overhead line being 0 degrees or ±30 degrees were fitted were respectively observed. The overhead line L2 is laid with a predetermined tension by a tension meter TM, and a target T attached to each of the dampers A2 for overhead line of the overhead line L2 was observed by photographing the target T through the use of ITV (Industrial TeleVision) cameras C1 and C2.

The targets T are respectively attached to the overhead line dampers A2, which were fitted to positions of 141 m and 203 m from the No. 3 steel tower ST3 to the No. 4 steel tower ST4, and the targets T were observed by continuously photographing the targets T for 24 hours through the use of the ITV cameras C1 and C2 which were installed in the No. 3 steel tower ST3.

Figure 8:
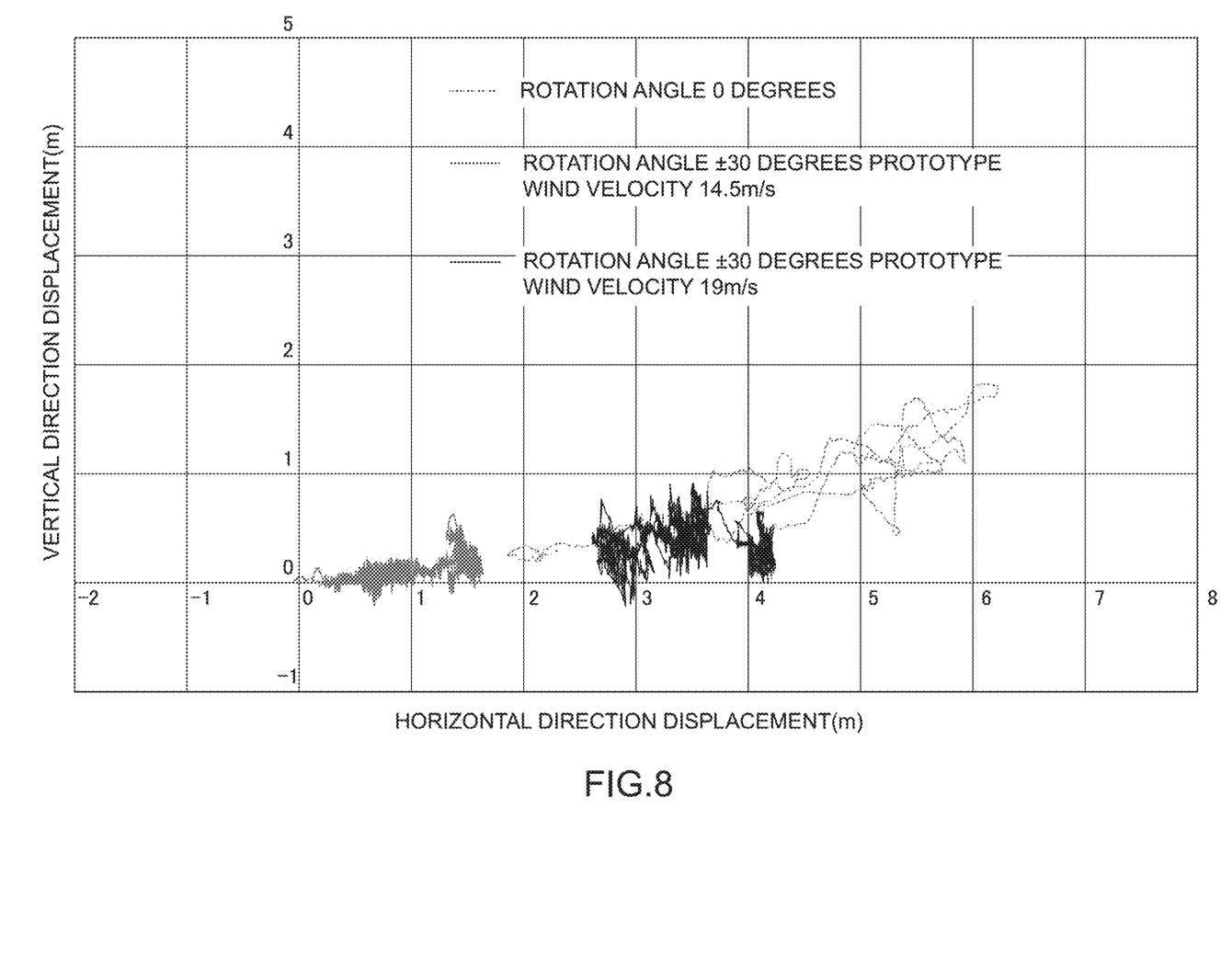
FIG. 8 is a diagram illustrating a relationship between a displacement in the horizontal direction and a displacement in the vertical direction of the overhead line under the observation condition.

A result of observation performed under the observation condition is illustrated in FIG. 8. FIG. 8 is a diagram illustrating by means of a Lissajous drawing a displacement in the horizontal direction and a displacement in the vertical direction in the case in which the targets T which were attached to the two overhead line dampers A2 of the four overhead line dampers were observed under the aforementioned observation condition.

In the Lissajous illustrated in FIG. 8, images obtained by photographing the targets T at a time of occurrence of a wind velocity shown by an anemometer AM installed in the No. 4 steel tower ST4 being a wind velocity of 17 m/s were extracted and illustrated in the case of the rotation angle RA of the weight W2 being 0 degrees, and images obtained by photographing the targets T at a time of wind velocities shown by the anemometer AM being a wind velocity of 14.5 m/s and a wind velocity of 19 m/s respectively were extracted and illustrated in the case of the rotation angles RA of the weight W2 being ±30 degrees.

As illustrated in FIG. 8, as for displacements in the vertical direction and the horizontal direction of the overhead line L2 to which the four dampers A2 for overhead line were fitted, the overhead line L2 was displaced in a range from approximately 1.9 m to 6.3 m in the horizontal direction and approximately 0.3 m to 1.9 m in the vertical direction in the case of the rotation angle RA being 0 degrees. Further, in the case of the rotation angle RA being ±30 degrees and the wind velocity being 14.5 m/s, the overhead line L2 displaced in a range from approximately 0 m to 1.6 m in the horizontal direction and approximately −0.2 m to 1.6 m in the vertical direction, and was displaced in a range from approximately 2.6 m to 4.3 m in the horizontal direction and approximately −0.2 m to 1.9 m in the vertical direction in the case of the rotation angle RA being ±30 degrees and the wind velocity being 19 m/s.

Since observation was performed in the aforementioned observation condition in this way, it was found based on the experimental result that, as compared with the case of the rotation angle RA of the weight W2 being 0 degrees, at ±30 degrees, the vibrations of the targets T in the vertical direction and the horizontal direction were suppressed under both the wind velocity of 14.5 m/s and the wind velocity of 19 m/s. Consequently, it is estimated that with the rotation angle RA of the weight W2 of ±30 degrees, the vibrations of the overhead line L2 can be effectively suppressed.

2. Entire Configuration of Damper for Overhead Line

Subsequently, with reference to FIG. 9 to FIG. 11, a configuration of the overhead line damper according to the embodiment of the present disclosure will be described. As for the overhead line dampers according to the embodiment of the present disclosure, overhead line dampers were adopted, each of which has a configuration in which when the overhead line has snow accreted on the overhead line and rotates by receiving wind or the like, the weights rotate in the angle range RA of ±30 degrees around the perpendicular line in the vertical direction, to the opposite direction to that in which the overhead line rotates, based on the results of the simulations in the first analysis condition and the second analysis condition described above, and the aforementioned observation result.

Figure 9:
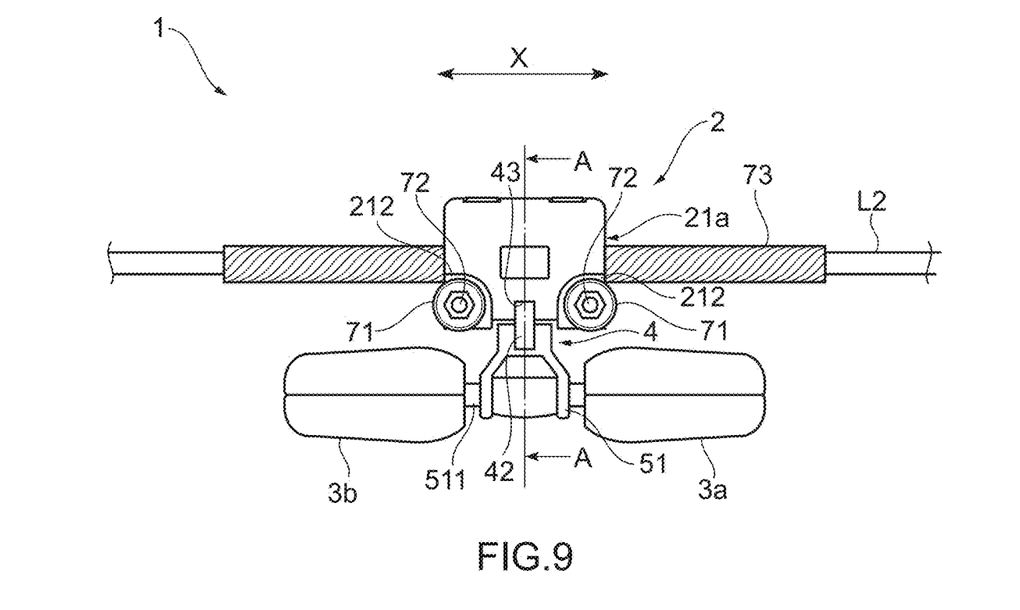
FIG. 9 is a plan view illustrating an entire configuration of an overhead line damper according to an embodiment of the present disclosure.
Figure 10:
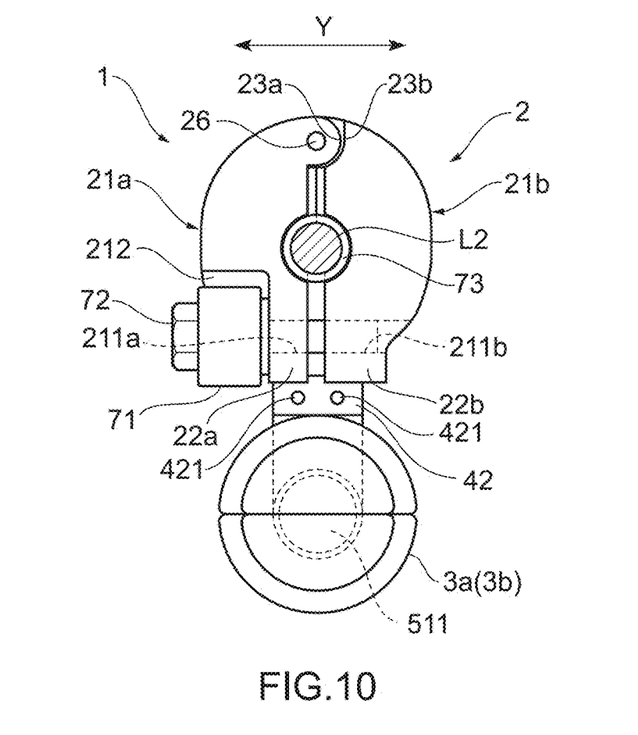
FIG. 10 is a side view of the overhead line damper illustrated in FIG. 9.

FIG. 9 is a plan view illustrating an entire configuration of an overhead line damper according to the embodiment of the present disclosure, and FIG. 10 is a side view of the overhead line damper 1. FIGS. 11A and 11B are sectional views in a section along line A-A illustrated in FIG. 9, FIG. 11A is a sectional view illustrating a state in which a pair of hinge pieces 21a and 21b in FIG. 10 are closed, and FIG. 11B is a sectional view illustrating a state in which the pair of hinge pieces 21a and 21b in FIG. 10 are opened.

As illustrated in FIG. 9, the overhead line damper 1 (corresponding to the overhead line damper A2) includes a clamping mechanism 2 that is fitted to the outer circumferential surface of the overhead line L2, and a rotary member 4 in which a lower part is attached to weights 3a and 3b, and an upper part is rotatably attached to the clamping mechanism 2.

Figure 11A:
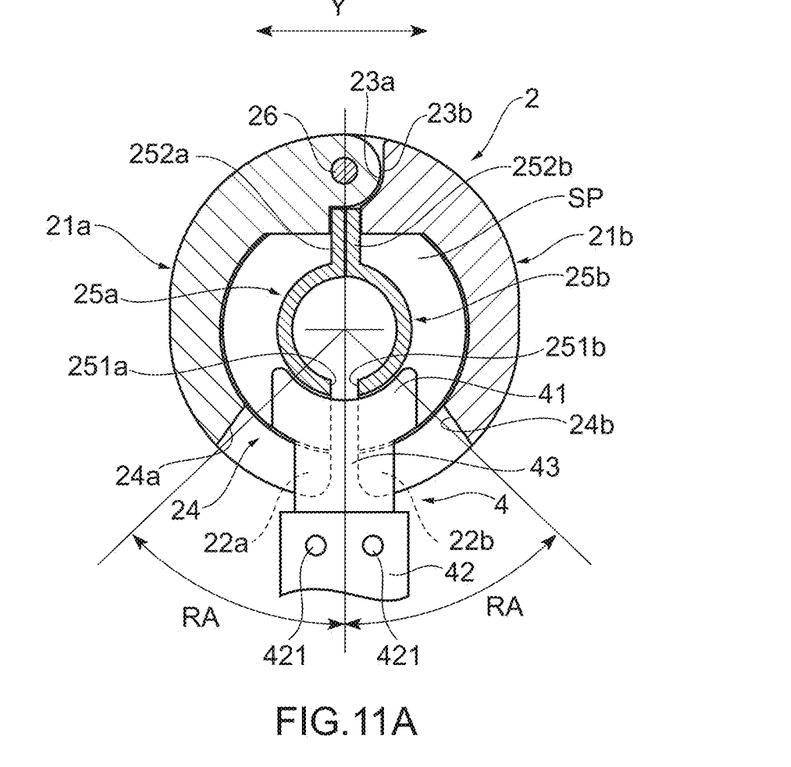

The clamping mechanism 2 has a pair of hinge pieces 21a and 21b as illustrated in FIG. 10, a pair of semi-tubular collars 25a and 25b that clamp the overhead lines L2 (refer to FIG. 10) inside the clamping mechanism 2 as illustrated in FIG. 11A, and a connection pin 26 that is provided in connection side end parts 23a and 23b.

As illustrated in FIG. 11A, the pair of hinge pieces 21a and 21b have rotation side end parts 22a and 22b at a side holding the rotary member 4, and the connection side end parts 23a and 23b which are connected to be able to open and close the rotation side end parts 22a and 22b of the hinge pieces 21a and 21b. The connection side end parts 23a and 23b are connected by the connection pin 26 to be openable and closable with the connection pin 26 as a center.

Figure 11B:
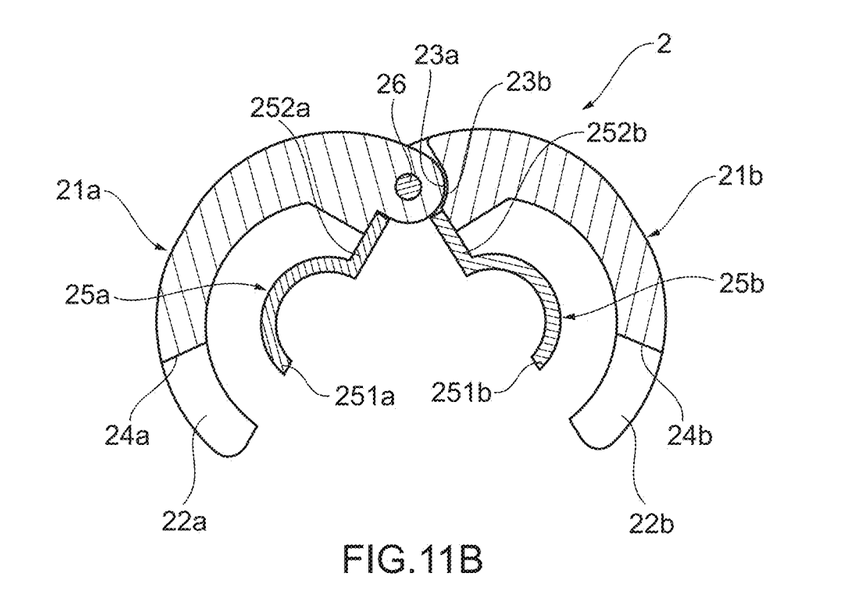

As illustrated in FIG. 11A, the pair of hinge pieces 21a and 21b are substantially circular in side view in a state in which the rotation side end parts 22a and 22b are brought closely to each other to be closed, but are substantially M-shaped in side view in a state in which the rotation side end parts 22a and 22b are separated from each other to be opened, as illustrated in FIG. 11B.

As illustrated in FIG. 10, bolt insertion holes 211a and 211b are respectively formed in the pair of hinge pieces 21a and 21b, and in a state in which the rotation side end parts 22a and 22b are closed, the bolt insertion holes 211a and 211b are located on an identical axis.

As illustrated in FIG. 10, in the hinge piece 21a, a recessed part 212 in which a lock nut 71 is placed is formed. Accordingly, a bolt 72 is fastened to the lock nut 71 which is placed in the recessed part 212 of the hinge piece 21a in a state in which the bolt 72 is inserted through the bolt insertion holes 211a and 211b (refer to FIG. 10).

The pair of hinge pieces 21a and 21b have an opening part (regulation part) 24 that regulates a rotation range of the rotary member 4 so that the weights 3a and 3b rotate in an angle range RA of ±30 degrees around a perpendicular line (a phantom line) in the vertical direction. The opening part 24 is a part in which a center in a lengthwise direction in a longitudinal direction X (refer to FIG. 9) is opened toward weights 3a and 3b sides in a main body of the clamping mechanism 2.

In this case, the opening part 24 is an opening that is demarcated in the main body of the clamping mechanism 2 by an opening end surface 24a that is an end part in a circumferential direction of the hinge piece 21a and is perpendicular to the circumferential direction, and an opening end surface 24b that is an end part in a circumferential direction of the hinge piece 21b and is perpendicular to the circumferential direction.

Accordingly, a connection part 43 of the rotary member 4 which will be described later abuts on the opening end surfaces 24a and 24b of the hinge pieces 21a and 21b, and the rotation range of the connection part 43 is regulated, so that the rotation angle RA with the perpendicular line (the phantom line) in the vertical direction as the center of the weights 3a and 3b is restricted to within the range of ±30 degrees.

As illustrated in FIG. 11A and FIG. 11B, the pair of collars 25a and 25b are formed in semi-tubular shapes at a side on which the overhead line L2 are clamped, and have clamping side end parts 251a and 251b of the collars 25a and 25b, and collar side connection end parts 252a and 252b in thin-plate shapes to which the clamping side end parts 251a and 251b are connected to be openable and closable.

The pair of collars 25a and 25b are substantially circular in a side view in a state in which the clamping side end parts 251a and 251b are brought close to each other to be closed as illustrated in FIG. 11A, but are substantially M-shaped in side view in a state in which the clamping side end parts 251a and 251b are separated from each other to be opened as illustrated in FIG. 11B.

Further, the collar side connection end parts 252a and 252b are connected by the connection pin 26 with the connection side end parts 23a and 23b of the pair of hinge pieces 21a and 21b. Therefore, the pair of hinge pieces 21a and 21b and the pair of collars 25a and 25b are openable and closable to extend or narrow in a direction along a short length direction Y (refer to FIG. 11A) of the clamping mechanism 2 with the connection pin 26 as a support point. That is, the pair of collars 25a and 25b open and close in association with opening and closing of the pair of hinge pieces 21a and 21b.

Subsequently, in order to prevent breaking of the overhead line L2, the pair of collars 25a and 25b clamp the overhead line L2 via an armor rod 73 having a predetermined length in a front and rear with the clamping mechanism 2 as a center (refer to FIG. 9). Note that the pair of collars 25a and 25b may be formed to have such a length as to be provided along the longitudinal direction X (refer to FIG. 9) of the clamping mechanism 2, for example, may be formed to have a length of only a central portion in a lengthwise direction in the longitudinal direction X, that is, may be formed partially in the lengthwise direction of the clamping mechanism 2.

As illustrated in FIG. 11A, the rotary member 4 has a rotary part 41 rotatable in a space SP between the hinge pieces 21a and 21b, and the collars 25a and 25b, a weight attaching part 42 to which the weights 3a and 3b (refer to FIG. 9) are attached, and the connection part 43 that connects the rotary part 41 and the weight attaching part 42.

The rotary member 4 is rotatably held with the rotary part 41 sliding with respect to inner circumferential surfaces of the rotation side end parts 22a and 22b of the hinge pieces 21a and 21b. That is, the rotary member 4 is not integrally connected to the clamping mechanism 2, but the rotary part 41 is rotated along the inner circumferential surfaces of the rotation side end parts 22a and 22b of the hinge pieces 21a and 21b in association with rotation of the weights 3a and 3b.

As illustrated in FIG. 10, a weight fixing metal fitting 51 (refer to FIG. 9) is connected to the weight attaching part 42 by pins 421 each in a rod shape. The weight fixing metal fitting 51 has an upper part attached to the weight attaching part 42, and a rod 511 in a rod shape inserted in a lower part. The weights 3a and 3b are fitted and fixed to one end and the other end of the rod 511 (refer to FIG. 9).

As illustrated in FIG. 11A, the connection part 43 is disposed in the opening part 24, one side is formed integrally with the rotary part 41, and the other side is connected to the weight attaching part 42. When the rotary member 4 rotates in association with rotation of the weights 3a and 3b, the connection part 43 regulates the rotation of the weights 3a and 3b by abutting on the opening end surfaces 24a and 24b of the opening part 24.

That is, the connection part 43 regulates a rotation range of the rotary member 4 so as not to rotate with the rotation angle RA of the weights 3a and 3b exceeding ±30 degrees by abutting on the opening end surfaces 24a and 24b of the opening part 24.

3. Method for Fitting Overhead Line Damper to Overhead Line

Thereafter, with reference to FIG. 10 and FIGS. 11A and 11B, a method for fitting the damper 1 for overhead line to the overhead line L2 will be described.

First of all, the pair of hinge pieces 21a and 21b and the pair of collars 25a and 25b are opened by separating the rotation side end parts 22a and 22b of the clamping mechanism 2 from each other, and the overhead line L2 is located between the pair of collars 25a and 25b (refer to FIG. 11B).

Thereafter, the pair of hinge pieces 21a and 21b and the pair of collars 25a and 25b are closed to bring the rotation side end parts 22a and 22b close to each other, and the rotation side end parts 22a and 22b are fixed in a state in which the rotation side end parts 22a and 22b are brought the closest proximity to each other by the lock nut 71 and the bolt 72, whereby the damper 1 for overhead line is fitted to the overhead line L2.

When the pair of hinge pieces 21a and 21b and the pair of collars 25a and 25b are closed, the rotary part 41 of the rotary member 4 to which the weights 3a and 3b are attached is rotatably held with respect to the rotation side end parts 22a and 22b of the hinge pieces 21a and 21b, whereby the weights 3a and 3b are integrated with respect to the overhead line L2 via the rotary member 4 (refer to FIG. 11A).

When the pair of hinge pieces 21a and 21b are closed in this way, the opening end surfaces 24a and 24b of the opening part 24 are formed, the connection part 43 of the rotary member 4 can abut on the opening end surfaces 24a and 24b of the opening part 24, and the rotation angle RA (refer to FIG. 11A) of the weights 3a and 3b to the vertical direction is regulated within the range of ±30 degrees.

Specifically, when the overhead line L2 has snow accreted on the overhead line L2 and rotates by receiving wind or the like, the clamping mechanism 2 rotates in association with the rotation, the weights 3a and 3b which are attached to the weight attaching part 42 of the rotary member 4 rotate in the opposite direction to that in which the overhead line L2 rotates by their own weights, and the rotary part 41 of the rotary member 4 rotates in association with the rotation of the weights 3a and 3b. Subsequently, when the rotation angle RA (refer to FIG. 11A) of the rotary member 4 exceeds ±30 degrees, the connection part 43 of the rotary member 4 abuts on the opening end surfaces 24a and 24b, so that the rotation range of the rotary member 4 is regulated.

In this way, in the damper 1 for overhead line which is fitted to the overhead line L2, when the overhead line L2 has snow accreted on the overhead line L2 and rotates by receiving wind or the like, the weights 3a and 3b rotate in the opposite direction to that in which the overhead line L2 rotates by their own weights, and the connection part 43 abuts on the opening end surfaces 24a and 24b of the opening part 24, whereby the rotation angles RA (refer to FIG. 11A) at which the weights 3a and 3b rotate are regulated within the range of ±30 degrees. Therefore, the twisting of the overhead line L2 is regulated within the range of ±30 degrees, whereby snow accretion adhering to the overhead line L2 is dispersed, and heavy snow accretion (cylinder snow) that excessively accretes on the overhead line L2 can be suppressed.

Subsequently, the twisting of the overhead line L2 is made within the range of ±30 degrees, whereby snow accretion adhering to the overhead line L2 is dispersed, and a lift force which the overhead line L2 receives due to wind or the like also can be minimized.

Further, the overhead line damper 1 does not additionally require parts for suppressing rotation of the weights 3a and 3b because the opening end surfaces 24a and 24b of the opening part 24 are formed when the pair of hinge pieces 21a and 21b are closed. Consequently, rotation of the weights 3a and 3b can be easily suppressed to be within the range of ±30 degrees without increasing a number of component parts.

Further, the overhead line damper 1 can be easily fitted by clamping the overhead line L2 by bringing the rotation side end parts 22a and 22b closely to each other, and closing the pair of hinge pieces 21a and 21b and the pair of collars 25a and 25b.

4. Other Embodiments

While in the aforementioned embodiment, the case in which the damper 1 for overhead line is provided at the overhead line L2 is described, the overhead line L2 also includes a ground wire in addition to a power transmission line (a power line).

Further, while in the aforementioned embodiment the case where the overhead line damper 1 regulates the rotation range of the rotary member 4 so that the weights 3a and 3b rotate at the rotation angles RA of ±30 degrees with respect to the vertical direction by the opening part 24 is described, the rotation range of the rotary member 4 may be regulated so that the weights 3a and 3b rotate within a range of the rotation angles RA from 20 degrees to 40 degrees inclusive, in accordance with the simulation result.

While a preferable embodiment of the present disclosure is described thus far, the present disclosure is not limited to the overhead line damper 1 according to the above described embodiment, but includes all modes included in the idea and the claims of the present disclosure. Further, in order to exhibit at least some of the aforementioned object and effects, the respective components may be selectively combined appropriately. For example, the shapes, materials, dispositions, sizes and the like of the respective components in the above described embodiment can be properly changed in accordance with a specific usage mode of the present disclosure.

REFERENCE SIGNS LIST

1 Overhead line damper
2 Clamping mechanism
3a, 3b Weight
4 Rotary member
21a, 21b Hinge piece
22a, 22b rotation side end part
23a, 23b Connection side end part
24 Opening part (regulation part)
24a, 24b Opening end surface
25a, 25b Collar
26 Connection pin
41 Rotary part
42 Weight attaching part
43 Connection part
51 Weight fixing metal fitting
71 Lock nut
72 Bolt
73 Armor rod
211a, 211b Bolt insertion hole
212 Recessed part
251a, 251b Clamping side end part
252a, 252b Collar side connection end part
421 Pin
511 Rod

What is claimed is:

1. An overhead line damper that is provided at an overhead line, comprising:
   a clamping mechanism that is fitted to an outer circumferential surface of the overhead line; and
   a rotary member with a lower part attached to a weight, and an upper part rotatably attached to the clamping mechanism,
   wherein the clamping mechanism has a regulation part that regulates a rotation range of the rotary member so that the weight rotates within an angle range from ±20 degrees to ±40 degrees inclusive with respect to a vertical direction of the weight, the regulation part has opening end surfaces that demarcate an opening part in which the clamping mechanism opens to a side of the weight; and
   wherein the rotary member has a rotary part that is rotatable between the overhead line and the clamping mechanism, and a connection part that connects the rotary part and the weight, the connection part regulates rotation of the weight by abutting on the opening end surfaces.

2. The overhead line damper according to claim 1, wherein the clamping mechanism is formed of a pair of hinge pieces,
   the pair of hinge pieces have rotation side end parts at sides that clamp the rotary member, and connection side end parts that connect the rotation side end parts to each other to be operable and closable, and
   the pair of hinge pieces have the opening end surfaces of the regulation part formed when the rotation side end parts are closed.

* * * * *